Jan. 3, 1928.　　　　　　　　　　　　　1,654,863
C. COOPER ET AL
DEHYDRATING AMMONIA VAPORS
Filed Feb. 5, 1927
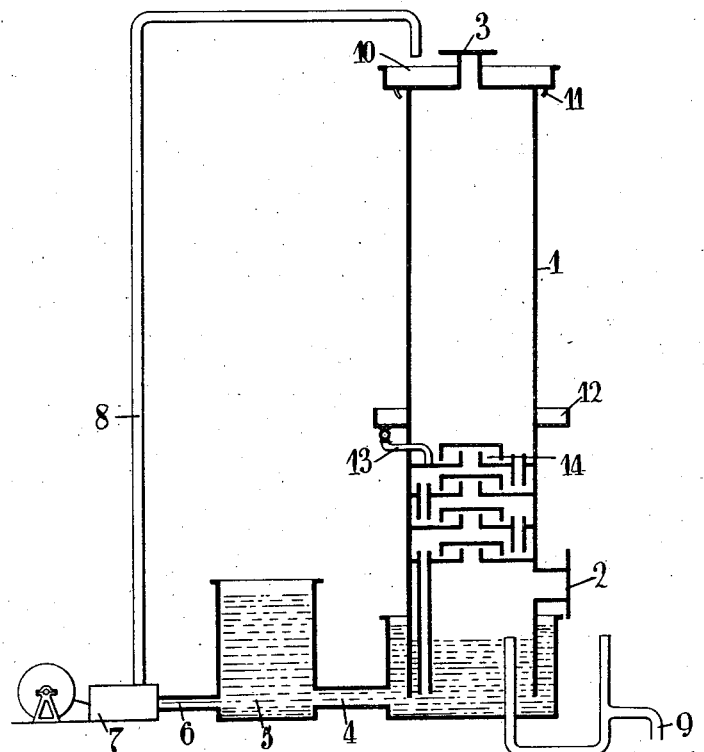
Inventors
Charles Cooper and
Daniel M. Henshaw
By Marks & Clerk Attys Patented Jan. 3, 1928.

1,654,863

UNITED STATES PATENT OFFICE.

CHARLES COOPER AND DANIEL MAYON HENSHAW, OF HUDDERSFIELD, ENGLAND, ASSIGNORS TO W. C. HOLMES AND COMPANY, LIMITED, OF HUDDERSFIELD, ENGLAND.

DEHYDRATING AMMONIA VAPORS.

Application filed February 5, 1927, Serial No. 166,253, and in Great Britain December 16, 1925.

This invention relates to the treatment of mixtures of ammonia and water vapor in order to effect the separation therefrom of a greater or less proportion of the contained moisture.

The invention consists broadly in bringing the ammonia associated with water into intimate contact with liquid materials having a selective affinity for the water.

Preferably in accordance with the invention the ammonia mixture is caused to flow in counter-current to the material having a selective affinity for the water in the mixture.

Thus in accordance with the invention in treating ammonia liquor the vapors arising from an ammonia still are brought into intimate contact with a liquid material having a selective affinity for the water component, preferably by causing the vapors and the liquid to flow in counter-current.

A variety of materials possessing a selective affinity for water may be employed in accordance with the invention. A solution of potassium carbonate is conveniently used where mixtures containing ammonia are treated, and, as will be understood, the solution employed in the treatment of mixtures containing ammonia is preferably maintained at a sufficiently high temperature to reduce further its capacity to absorb ammonia. Should any considerable proportion of ammonia be absorbed by the material possessing a selective affinity for water means may be provided for recovering the ammonia so absorbed.

Where the invention is applied to the separation of moisture from mixtures of ammonia, steam and other gases, such for instance as arise in the treatment of ammonia liquor, solutions of ammonia of high concentration may be obtained with simplified apparatus.

Similarly the invention may be applied to the removal of moisture from such gases and the direct treatment of the gases to obtain ammonium salts, such for instance as sulphate of ammonia.

Further, the invention may be applied to the production of sublimed ammonium carbonate from still gases, and the process of producing ammonium salts in the manner specified falls within the scope of the present application.

As an example of our process, the vapors arising from an ammonia still are caused to pass through a distillation or rectifying column through which in the reverse direction to the flow of gas and vapor a solution of potassium carbonate is caused to travel.

The column may comprise a plurality of trays furnished with overflow devices and with means whereby the gases and vapors are caused to come into contact with successive bodies of the solution.

The column will normally be furnished with means adapted to deliver the solution of potassium carbonate to a device whereby it may be reconcentrated and returned to the column.

Suitable apparatus for use in the invention comprises essentially a column or tower, means for introducing thereinto the mixture of vapors or vapors and gases to be treated, means for introducing into the column liquid material having a selective affinity for water, means for bringing the said material into intimate contact with the vapor or vapors and gases introduced into the column, means for withdrawing from the column the material possessing a selective affinity for one of the constituents of the mixture, means for concentrating the said material or expelling the water therefrom, and means adapted to return the material after concentration or partial removal of the water to the column.

Certain constructions in accordance with the invention are illustrated by way of example in the accompanying drawing, in which:

Figure 1 is a view in section of a suitable construction.

In the drawing, a tower 1 is provided with a vapor inlet 2 and an outlet 3 and with a liquor outlet 4 leading to a tank 5 from which extends a pipe 6 connecting the same with a pump 7 furnished with a delivery 8. The tower is provided with an overflow device 9.

In the construction illustrated the delivery 8 of the pump is arranged to elevate liquid into the vessel 10 which at its base is provided with a number of jets 11 adapted to direct the liquid discharged from the vessel 10 on to the walls of the tower down which liquid will run, being finally collected in the channel 12 communicating by the pipe 13 with a number of bubbling trays of known construction 14 adapted to cause the vapors introduced by way of the pipe 2 to make intimate contact with the liquid delivered thereinto. The liquid in question, as above explained, will be a material having a selective affinity for one of the constituents of the mixture, for instance water, and the material diluted with water will collect in the base of the tower from which it will be transferred by the pump, as above explained, to the vessel 10 and in travelling over the external surface of the tower the heat contained in the vapors will cause the water taken up to be evaporated.

In conclusion it is to be observed that various changes may be made in the details of the process and apparatus as above defined without exceeding the scope of the present specification.

Having now described our invention, what we claim as new and desire to secure by Letters Patent is:—

1. The process of treating a mixture of water vapor and ammonia which comprises causing the mixture to flow in intimate contact and in counter current with a liquid material having a selective affinity for water and maintaining the liquid material at a relatively high temperature to reduce its ammonia-absorbing capacity.

2. A process according to claim 1, in which the liquid material is a solution of potassium carbonate.

In testimony whereof we have signed our names to this specification.

CHARLES COOPER.
DANIEL MAYON HENSHAW.